United States Patent
Bladow et al.

(10) Patent No.: US 11,677,771 B2
(45) Date of Patent: Jun. 13, 2023

(54) COMMUNITY THREAT INTELLIGENCE AND VISIBILITY FOR OPERATIONAL TECHNOLOGY NETWORKS

(71) Applicant: Dragos, Inc., Hanover, MD (US)

(72) Inventors: Garrett Bladow, Baltimore, MD (US); Robert Lee, Gambrills, MD (US); Benjamin Whitney, Annapolis, MD (US); Jerry Matthew Bodman, Crownsville, MD (US)

(73) Assignee: Dragos, Inc., Hanover, MD (US)

( * ) Notice: Subject to any disclaimer, the term of this patent is extended or adjusted under 35 U.S.C. 154(b) by 111 days.

(21) Appl. No.: 17/318,539

(22) Filed: May 12, 2021

(65) Prior Publication Data

US 2022/0368711 A1 Nov. 17, 2022

(51) Int. Cl.
*H04L 29/06* (2006.01)
*H04L 9/40* (2022.01)

(52) U.S. Cl.
CPC ........ *H04L 63/1425* (2013.01); *H04L 63/101* (2013.01); *H04L 63/102* (2013.01); *H04L 63/105* (2013.01); *H04L 63/1433* (2013.01); *H04L 63/1441* (2013.01)

(58) Field of Classification Search
CPC . H04L 63/1425; H04L 63/101; H04L 63/102; H04L 63/105; H04L 63/1433; H04L 63/1441
See application file for complete search history.

(56) References Cited

U.S. PATENT DOCUMENTS

| | | | | |
|---|---|---|---|---|
| 10,469,514 | B2 * | 11/2019 | Wang | H04L 63/1433 |
| 10,746,567 | B1 * | 8/2020 | Bernau | G01D 4/002 |
| 10,791,421 | B1 * | 9/2020 | Rothschild | G06F 16/9537 |
| 10,956,187 | B2 * | 3/2021 | Petkov | G06F 21/6254 |
| 11,222,111 | B2 * | 1/2022 | Reybok | G06F 21/552 |
| 2014/0358745 | A1 * | 12/2014 | Lunan | G06Q 40/12 705/30 |
| 2017/0228658 | A1 * | 8/2017 | Lim | G06F 21/56 |
| 2020/0074084 | A1 * | 3/2020 | Dorrans | G06F 21/577 |
| 2020/0153843 | A1 * | 5/2020 | Aksela | H04L 63/145 |
| 2020/0311259 | A1 * | 10/2020 | Schmugar | G06F 21/554 |
| 2020/0322373 | A1 * | 10/2020 | Njilla | G06N 5/003 |
| 2021/0279632 | A1 * | 9/2021 | Di Pietro | H04L 41/147 |
| 2021/0352088 | A1 * | 11/2021 | Adams | H04L 63/1433 |

* cited by examiner

*Primary Examiner* — Shin-Hon (Eric) Chen
(74) *Attorney, Agent, or Firm* — Ellen Wei (57) ABSTRACT

Techniques are provided for community threat intelligence for operational technology networks. For a plurality of OT networks, at least one monitoring device processes OT network traffic and collects telemetry data, and a telemetry sanitization system applies a sanitization process to the telemetry data to generate sanitized telemetry data that does not include sensitive data. A computer system receives sanitized telemetry data from the telemetry sanitization systems provided for the plurality of OT networks, maintains threat intelligence data generated based on the sanitized telemetry data, and provides access to at least one of the threat intelligence data and the sanitized telemetry data to a plurality of users.

20 Claims, 6 Drawing Sheets

COMMUNITY THREAT INTELLIGENCE AND VISIBILITY FOR OPERATIONAL TECHNOLOGY NETWORKS

This Invention was made with government support under Contract No. DE-OE0000898 awarded by the Department of Energy. The Government has certain rights in this invention.

FIELD OF THE DISCLOSURE

The present disclosure generally relates to operational technology networks, and relates more specifically to private and secure collection and analysis of community threat intelligence data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Operational technology (OT) refers to hardware and software systems that are used to monitor and control physical processes, devices, and infrastructure. OT includes industrial control systems. Industrial control systems are configured to monitor and control industrial processes in areas such as oil, gas, manufacturing, building automation, mining operations, electricity generation/distribution, other utilities, transportation, pharmaceutical, and the like. As OT systems become more connected, they are exposed to more vulnerabilities. Security threats can cause major disruptions to OT environments that can damage expensive equipment and infrastructure, and can be costly to remediate.

SUMMARY

The appended claims may serve as a summary.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures. However, using the particular arrangement illustrated in the one or more other figures is not required in other embodiments.

DETAILED DESCRIPTION

In the following description, numerous specific details are set forth in order to provide a thorough understanding of the present invention. It will be apparent, however, that the present invention may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

It will be understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "module" may be hardware, and/or software stored in, or coupled to, a memory and/or one or more processors on one or more computers. Additionally and/or alternatively, a module may comprise specialized circuitry. For example, a module (such as but not limited to threat detection module 210, sanitation module 212, reporting module 214, sanitized data receiving module 230, threat analysis module 232, community portal server module 234, and community portal client module 252 of FIG. 2) may be hardwired and/or persistently programmed with a set of instructions to perform the functions discussed herein. A module may be a standalone module, work in conjunction with one or more other modules, contain one or more other modules, and/or belong to one or more other modules.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based cluster of computers, virtual machine instances, and/or other computing devices. A computer system may include another computer system, and a computing device may belong to two or more computer systems. Any reference to a "computer system" may mean one or more computers, unless expressly stated otherwise. When a computer system performs an action, the action is performed by one or more computers of the computer system.

A "device" may be a computer system, hardware, and/or software stored in, or coupled to, a memory and/or one or more processors on one or more computers. Additionally or alternatively, a device may comprise specialized circuitry. For example, a device may be hardwired or persistently programmed to support a set of instructions to perform the functions discussed herein. A device may be a standalone component, work in conjunction with one or more other devices, contain one or more other devices, and/or belong to one or more other devices.

A "client" refers to a combination of integrated software components and an allocation of computational resources, such as memory, a computing device, and/or processes on a computing device for executing the integrated software components. The combination of the software and computational resources are configured to interact with one or more servers over a network, such as the Internet. A client may refer to either the combination of components on one or more computers, or the one or more computers (also referred to as "client computing devices").

A "server" refers to a combination of integrated software components and an allocation of computational resources, such as memory, a computing device, and/or processes on the computing device for executing the integrated software components. The combination of the software and computational resources is dedicated to providing a particular type of function on behalf of clients of the server. A server may refer to either the combination of components on one or more computing devices, or the one or more computing devices (also referred to as "server system"). A server system may include multiple servers; that is, a server system may include a first computing device and a second computing device, which may provide the same or different functionality to the same or different set of clients.

General Overview

This document generally describes systems, methods, devices, and other techniques for community threat intelligence for operational technology networks. For a plurality of OT networks, at least one monitoring device processes OT network traffic and collects telemetry data and a telemetry sanitization system applies a sanitization process to the telemetry data to generate sanitized telemetry data that does not include sensitive data. A computer system receives sanitized telemetry data from the telemetry sanitization systems provided for the plurality of OT networks, maintains threat intelligence data generated based on the sanitized telemetry data, and provides access to at least one of the threat intelligence data and the sanitized telemetry data to a plurality of users.

In some implementations, the various techniques described herein may achieve one or more of the following advantages: a collective defense framework is enabled while protecting the privacy and identity of participants, individuals associated with participants, participant networks, and participant devices; participant privacy is preserved in accordance with laws and regulations; participant identities are protected in the event of a security breach at the community threat intelligence system; storage of sensitive and/or identifiable data outside of a participant's network is avoided; participant OT data remains non-attributable in the event of a security breach at the community threat intelligence system; an entity that operates a community threat intelligence system may better protect its users, networks, and systems from malicious actors; sanitized telemetry data from multiple OT networks may be analyzed to generate threat intelligence data and countermeasures that are more effective than those that could be developed using telemetry data from a single network; evolving OT threats may be detected and characterized more quickly; decision making before, during, and after a security incident may be improved; recovery time from a security incident may be reduced; and adversary dwell time in an OT network may be reduced. Additional features and advantages are apparent from the specification and the drawings.

System Overview

Figure 1:
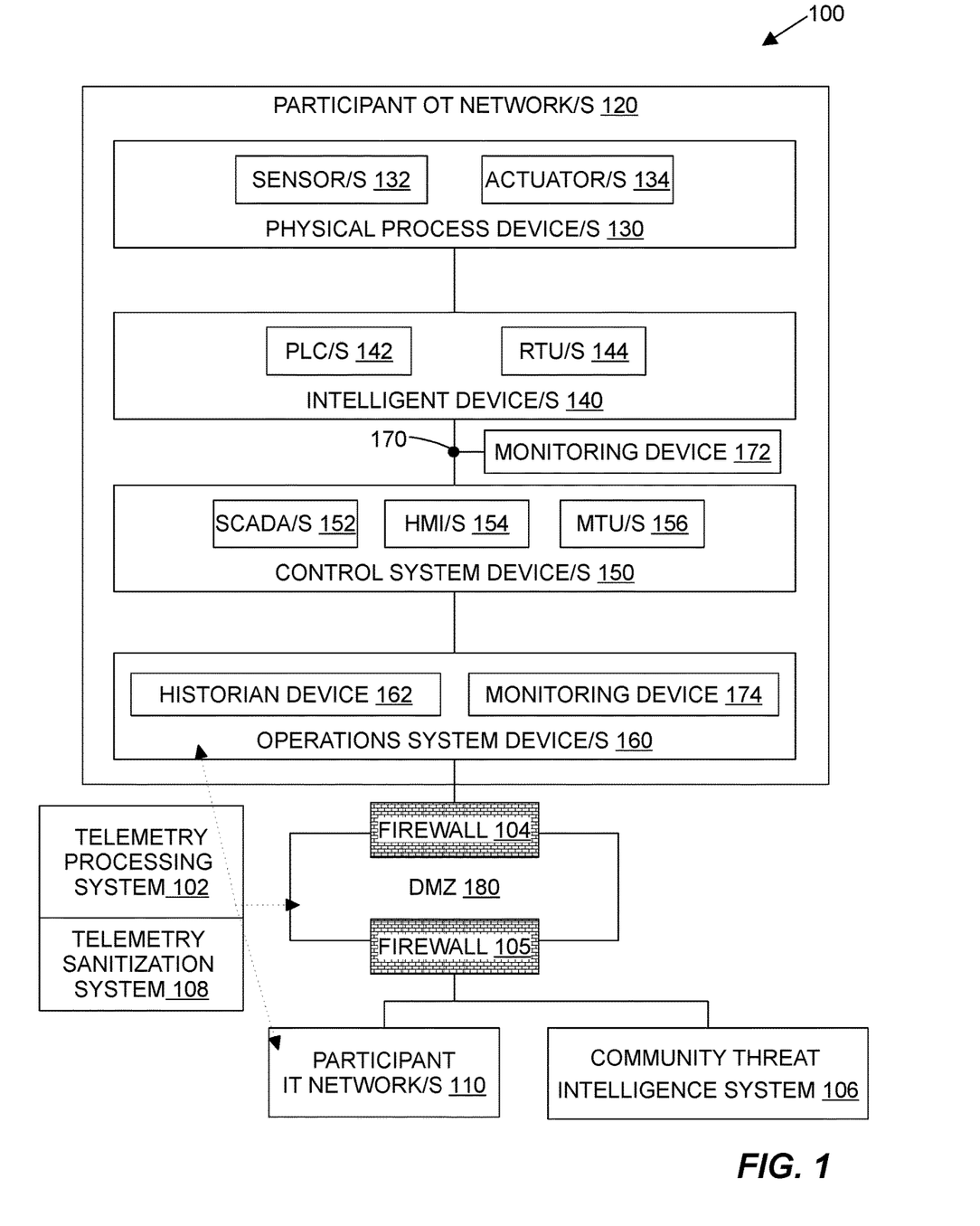
FIG. 1 illustrates a computer system that includes a participant OT network and a community threat intelligence system in an example embodiment.

FIG. 1 illustrates a computer system that includes a participant operational technology (OT) network and a community threat intelligence system in an example embodiment. The computer system 100 includes one or more monitoring devices 172-174 in a participant OT network 120, a telemetry sanitization system 108, and a community threat intelligence system 106. The telemetry sanitization system 108 generates sanitized telemetry data from telemetry data collected by the monitoring devices 172-174 in the participant OT network 120 and provides the sanitized telemetry data to the community threat intelligence system 106. The community threat intelligence system 106 services one or more participant OT networks 120 by receiving the sanitized telemetry data, generating threat intelligence data based on the sanitized telemetry data, and providing the threat intelligence data to participants and/or other users without compromising the identity or the security of the participant OT network/s 120.

A participant is a company, organization, or other entity that operates an OT network 120. A participant may operate one or multiple OT networks. For example, an organization may operate multiple OT networks 120 that are segmented into different subnets to control the flow of traffic for better protection. Network segmentation limits an attacker's ability to move through the network. Network segmentation may be achieved through various techniques known in the art, such as but not limited to air gapping, firewalls, virtual LANs (VLANs), zoning, and/or other techniques. As another example, an organization may operate OT networks 120 at multiple locations, such as remote locations or field locations where automation of industrial systems is implemented. While the computer system 100 illustrates one participant OT network 120 serviced by the community threat intelligence system 106, the community threat intelligence system 106 may service multiple participant OT networks 120, which may include multiple OT networks 120 operated by one participant and/or OT networks 120 operated by multiple participants.

The participant OT network 120 includes one or more physical process devices 130. The physical process device/s 130 include one or more instruments or other physical components directly involved in carrying out an industrial process. For example, the physical process device/s 130 may include one or more sensors 132, actuators 134, other physical process devices, and/or any combination thereof. A sensor 132 is a component that converts a physical phenomenon into a digital and/or analog signal, such as to detect and/or monitor changes in an environment. The digital signal may be transmitted to another device in the OT network 120. Examples of sensors 132 include temperature sensors, humidity sensors, pressure sensors, light sensors, flow sensors, touch sensors, proximity sensors, location sensors, accelerometers, gyroscopes, gas sensors, infrared sensors, and/or any other device that can acquire data in the environment in which the device is deployed. An actuator 134 is a component that is responsible for moving and/or controlling a physical mechanism in the environment in which the actuator 134 is deployed. An actuator 134 may act in response to control signals transmitted from another device in the OT network 120. Examples of actuators 134 include switches, valves, motors, piezo generators, and/or any other device that controls a physical mechanism.

The participant OT network 120 may include one or more intelligent devices 140. An intelligent device 140 includes one or more microcontrollers or other processors that are configured to receive data from and/or send control commands to one or more physical process devices 130. An intelligent device 140 may be directly connected to one or more physical process devices 130. For example, the intelligent device/s 140 may include one or more programmable logic controllers (PLCs) 142, remote terminal units (RTUs 144), 146, other intelligent devices, and/or any combination thereof.

The participant OT network 120 may include one or more control system devices 150. A control system device 150 communicates with lower-level control devices, such as intelligent devices 140, to monitor and control processes and operations in the participant OT network 120. For example, the control system device/s 150 may include one or more supervisory control and data acquisition (SCADA) systems 152, human-machine interfaces (HMIs) 154, master terminal units (MTUs) 156, alarm and alert systems, control room workstations, other control system devices, and/or any combination thereof.

The participant OT network 120 may include one or more operations system devices 160. An operations system device 160 may support site operations within the participant OT network 120. An operations system device 160 may handle communications from the participant OT network 120 to a device in another participant network. Examples of operations system devices 160 include database servers, application servers, file servers, reliability assurance systems, scheduling and reporting systems, engineering workstations, and the like. The operation system device/s 160 may include at least one historian device 162. The historian device 162 aggregates and records production and process data from various sources in the participant OT network 120, such as but not limited to one or more sensors 132, actuators 134, PLCs 142, RTUs 144, IEDs 146, SCADAs 152, and/or MTUs 156.

The participant OT network 120 may be isolated from the Internet and/or one or more participant IT network/s 110. For example, a firewall 104 may be positioned at the perimeter of the participant OT network 120. A firewall 104 is a network security device that monitors incoming and outgoing network traffic. The firewall 104 may permit and/or block data packets based on a set of security rules. The firewall 104 may protect the participant OT network 120 from unwanted network traffic, such as malicious code, intrusion attempts, and/or other unwanted traffic.

In some embodiments, a participant OT network 120 may include a demilitarized zone (DMZ) 180. A DMZ is a sub-network placed between two networks with different trust levels, such as an OT network and an enterprise network, to add an additional layer of security. A DMZ may be implemented using firewalls, proxy servers, intrusion detection systems (IDSs), intrusion prevention systems (IPSs), and/or other systems. For example, a first firewall 104 may be positioned between the DMZ 180 and the participant OT network 120, and a second firewall 105 may be positioned between the DMZ 180 and external networks, such as the participant IT network 110 and the Internet. Systems typically deployed in the DMZ 180 include proxy servers and the like.

In FIG. 1, network connectivity is illustrated in a simplified manner between physical process devices 130 and intelligent devices 140, between intelligent devices 140 and control system devices 150, and between control system devices 150 and operations system devices 160. However, network communications may be enabled within any devices within the participant OT networks 120.

One or more monitoring devices 172-174 may be deployed in a participant OT network 120. A monitoring device 172-174 is configured to collect and/or process network traffic in the participant OT network 120. For example, a monitoring device 172-174 may process the network traffic to generate telemetry data that may be further processed by the telemetry processing system 102. A monitoring device 172-174 may gain access to the network traffic by being connected to the participant OT network 120.

One or more monitoring devices 172-174 may be deployed at any location in the participant OT network 120 to collect network traffic passing through the respective location. For example, a monitoring device 172 may be connected to equipment 170 in the participant OT network 120 that provides the monitoring device 172 access to network traffic. The equipment 170 may be an active device or a passive network device. In some embodiments, the equipment 170 includes a switch that includes a switched port analyzer (SPAN) port. The monitoring device 172 is coupled to the SPAN port such that the switch sends a mirrored copy of network traffic passing through the switch to the monitoring device 172. As an alternative or addition, the equipment 170 may be a network tap. A network tap is a system that monitors events on a local network. For example, a network tap may send all passing traffic to the monitoring device 172. In some embodiments, a monitoring device 174 is deployed in participant OT network 120 as an operations system device 160. A monitoring device 174 that is deployed as an operations system device 160 may also be connected to equipment such as a SPAN port of a switch, a network tap, or other equipment that provides the monitoring device 174 access to network traffic.

A monitoring device 172-174 may process the network traffic to generate telemetry data. For example, a monitoring device 172-174 may perform deep packet inspection of communications sent in accordance with various industrial protocols to extract telemetry data related to the operation of the participant OT network 120. Deep packet inspection evaluates packets transmitted through an inspection point in a network, including packet header and packet data. Deep packet inspection may identify non-compliance to a communication protocol and unauthorized communications within a network. The monitoring device/s 172-714 may provide the extracted telemetry data to a telemetry processing system 102.

Telemetry Processing System

The telemetry processing system 102 processes telemetry data collected by one or more monitoring devices 172-174 in a participant OT network 120. For example, the telemetry processing system 102 may analyze the telemetry data to identify abuse and detect potential threats in the participant OT network 120. In some embodiments, a telemetry processing system 102 may process telemetry data collected from one or multiple participant OT networks 120 operated by a particular participant. In some embodiments, the telemetry processing system 102 has access to additional data generated within the participant OT network 120, such as but not limited to firewall logs, OT system logs generated by one or more devices 130-174 of the participant OT network 120, IT system logs that support and/or augment OT data, other host-based logs, properties of the participant OT network 120 and/or devices 130-174 in the participant OT network 120, and/or historian data generated by a historian device 162.

The telemetry sanitization system 108 sanitizes collected telemetry data and/or transmits sanitized telemetry data to the community threat intelligence system 106. In some embodiments, the telemetry sanitization system 108 is a subsystem of the telemetry processing system 102, which may perform additional functionality as described in greater detail hereinafter. As an alternative or addition, the telemetry sanitization system 108 may be the telemetry processing system 102. As an alternative or addition, the telemetry sanitization system 108 may be a standalone system that is distinct from the telemetry processing system 102. The telemetry processing system 102 and/or the telemetry sanitization system 108 may be deployed in various network configurations with respect to a participant OT network 120 without departing from the spirit or scope of the embodiments described herein. For example, a telemetry processing system 102 and/or a telemetry sanitization system 108 may be deployed as a physical device or a virtual device on-premises, such as within a participant OT network 120, within the DMZ 180 associated with a participant OT network 120, within a participant IT network 110, or at another location on-premises operated by the participant. As an alternative or addition, the telemetry processing system 102 and/or the telemetry sanitization system 108 may be virtually deployed on behalf of the participant in a cloud computing environment. Example deployment configurations for the telemetry processing system 102 are described in greater detail hereinafter.

Figure 2:
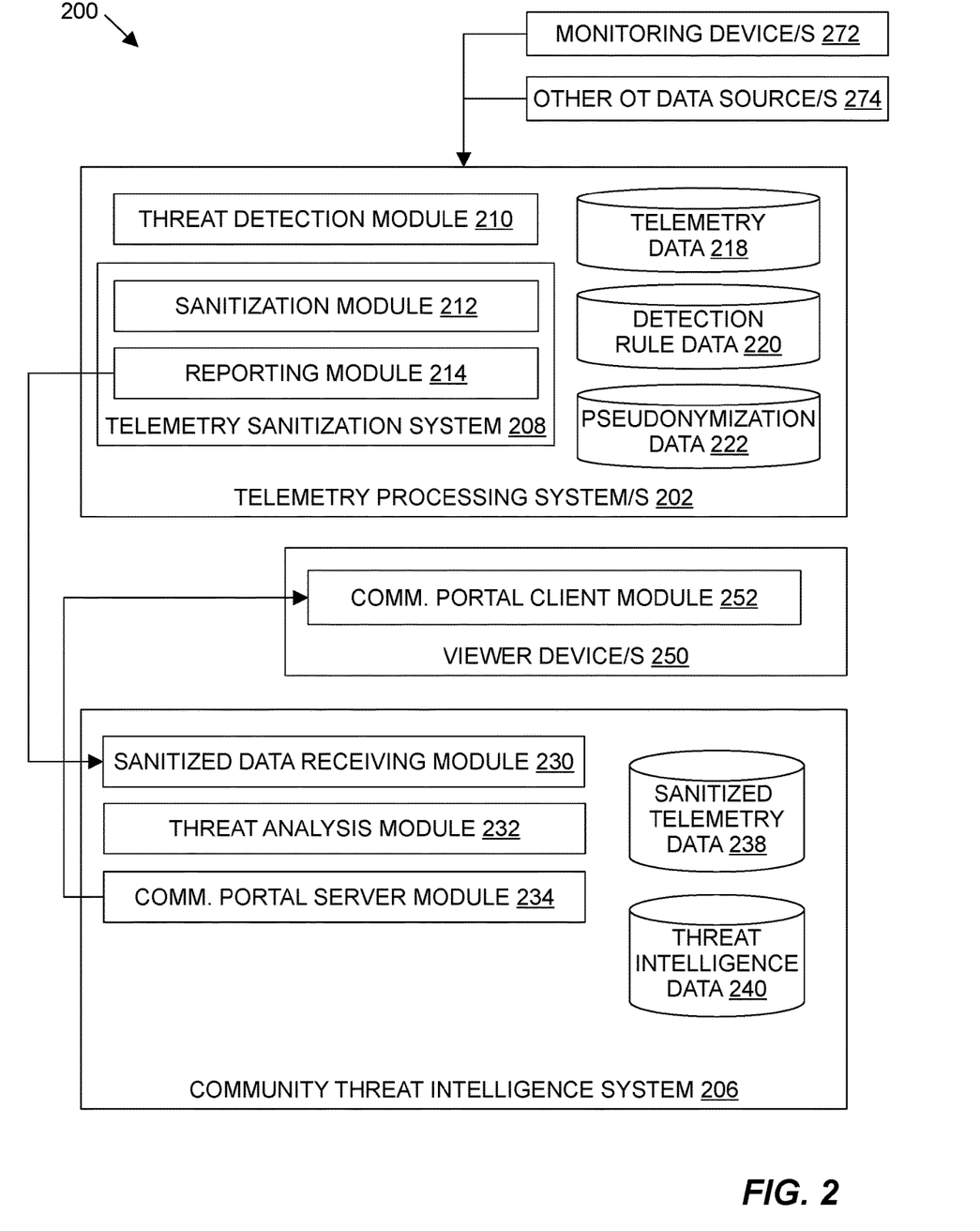
FIG. 2 illustrates a computer system that includes a telemetry processing system deployed for a participant OT network and a community threat intelligence system in an example embodiment.

FIG. 2 illustrates a computer system that includes a telemetry processing system deployed for a participant OT network and a community threat intelligence system in an example embodiment. The computer system 200 includes a set of telemetry processing systems 202, a community threat intelligence system 206, and a set of viewer devices 250. For clarity, one or more embodiments are described with respect to one telemetry processing system 202 and/or one viewer device 250.

The telemetry processing system 202 receives and processes telemetry data 218 collected in an OT network (e.g. participant OT network 120). For example, the telemetry processing system 202 may receive telemetry data 218 collected from one or more monitoring devices 272 deployed in an OT network. The telemetry data 218 may include raw OT network traffic collected by the monitoring device/s 272. As an alternative or addition, the telemetry data 218 may include processed OT network traffic and/or metadata generated by the monitoring device/s 272 and/or the telemetry processing system 202. As an alternative or addition, the telemetry data 218 may include other OT data received from one or more other OT data sources 274, such as firewall logs, OT system logs, IT system logs, OT network information, properties for one or more devices in the OT network, historian data, and/or other data. The telemetry data 218 may include sensitive and/or identifiable information with respect to the participant, an individual associated with the participant, the participant OT network, and/or participant devices in the OT network.

The telemetry processing system 202 may include a threat detection module 210, a sanitization module 212, and/or a reporting module 214. The threat detection module 210, the sanitization module 212, and/or the reporting module 214 may include separate and/or shared processes. The threat detection module 210, a sanitization module 212, and/or a reporting module 214 may execute as one or multiple applications on one or more computer systems, and may be implemented in a distributed system architecture, a cloud system architecture, and/or a virtual system. The telemetry sanitization system 208 is illustrated as a subsystem of the telemetry processing system 202 that includes the sanitization module 212 and the reporting module 214. As an alternative or addition, the telemetry sanitization system 208 may be a standalone system. Example deployment configurations are described in greater detail hereinafter.

The threat detection module 210 analyzes the telemetry data 218 to identify vulnerabilities, anomalies, intrusions, or other security threats in the OT network. In some embodiments, the threat detection module 210 uses detection rule data 220 to analyze the telemetry data 218. The detection rule data 220 may include one or more security event rules that define when telemetry data 218 potentially indicates a security threat. A security event rule may be generated based on a known threat that has been discovered and characterized by analysts. In some embodiments, a security event rule may be generated by the community threat intelligence system 206 based on the automated and/or manual analysis of sanitized telemetry data 238 from a community of participant OT networks. A security event rule may describe how to detect a threat signature, a configuration change (e.g., a new certificate, a new source IP), anomaly detection (e.g., sensor readings that deviate from a baseline), network traffic patterns, or other characteristics associated with a security threat. A security event rule may also be based on the detection of behavior associated with a security threat (e.g., a traffic pattern indicative of multiple logins, a brute force attack, or an ICMP sweep). In some embodiments, a security event rule may be based on the detection of a series of behaviors associated with a known security threat. For example, a security threat may be associated with a series of behaviors that includes a new communication between devices using a new protocol, followed by the download of a particular file by a device, followed by the performance of an ICMP sweep by the device.

The telemetry data 218 may include sensitive and/or identifiable information with respect to the participant, the participant OT network, and/or participant devices in the OT network. For example, the threat detection module 210 may use sensitive and/or identifiable information to detect vulnerabilities, anomalies, intrusions, or other security threats involving specific devices on the OT network. The sensitive and/or identifiable information may provide visibility that is critical to a participant's understanding and mitigating a security threat on the OT network. However, outside of the OT network, the sensitive and/or identifiable data may reveal a participant's identity or be used for reconnaissance by an adversary. Such data may not be necessary for developing community threat intelligence. For example, an analyst studying a security threat that occurs in a large number of OT networks does not need to know the IP address of a device or the identity of a particular organization whose OT network is under attack by the security threat.

The sanitization module 212 prepares telemetry data 218 for transmission to the community threat intelligence system 206 by applying a sanitization process to the telemetry data 218. The sanitization process removes sensitive and identifying information about a participant (or individual), participant network, and/or participant devices from the telemetry data 218. The resulting sanitized telemetry data 238 still includes contextual data that provides adequate information for collective threat intelligence analysis.

In some embodiments, the telemetry processing system 202 reduces the amount of data transmitted out of the participant's OT network to the community threat intelligence system 206. Reduction is another technique that enhances privacy. The telemetry processing system 202 may determine a subset of the telemetry data 218 for transmission based on relevance. In some embodiments, the telemetry processing system 202 transmits sanitized telemetry data 238 describing communications that have triggered detection of a vulnerability, anomaly, intrusion, or other security threat (e.g., by the threat detection module 210).

The sanitization module 212 is configured to prevent personally identifiable and/or sensitive data from leaving the participant's network. The sanitization module 212 may carry out deidentification on the telemetry data 218 using various techniques. For example, the sanitization module 212 may remove, anonymize, and/or pseudonymize one or more pieces of telemetry data 218 that are sensitive and/or identifying. Pseudonymization is a procedure by which identifiable information is replaced by one or more artificial identifiers, or pseudonyms. The telemetry processing system 202 may maintain pseudonymization data 222. For example, the pseudonymization data 222 may include a participant pseudonym (e.g., participant pseudonym 466). The sanitization module 212 may replace one or more identifying data properties with the participant pseudonym.

The community threat intelligence system 206 does not possess sufficient data that is necessary to reidentify any participants, individuals associated with a participant, participant networks, and/or participant devices. However, the sensitive and/or identifying data remains within the participant's OT network so that the participant may leverage such data on-premises. In some embodiments, the community threat intelligence system 106 publishes information and/or requests to a participant pseudonym without knowing the identity of the corresponding participant. The participant is able to access the information and/or requests using its participant pseudonym without revealing sensitive and/or identifying information to the community threat intelligence system 206. For example, a participant may establish a secure connection with the community threat intelligence system 206 using an authentication method that allows the participant access to published information and/or requests specifying the participant's pseudonym. The authentication method may be configured to not reveal the identity of the participant, the identity of an individual associated with the participant, and/or any OT network or device information. Example sanitization techniques are described in greater detail hereinafter.

The reporting module 214 provides sanitized telemetry data 238 generated by the sanitization module 212 to the community threat intelligence system 206. The sanitized telemetry data 238 may include only non-sensitive and non-identifying data. The reporting module 214 may be configured to establish a secure communication channel with the community threat intelligence system 206. In some embodiments, the reporting module 214 is authorized to establish a direct, outgoing connection to the community threat intelligence system 306 over the Internet, and no remote access of the participant's OT network is required. By eliminating the need for incoming communications, an opportunity for malicious access of the participant's OT network is also eliminated. Example deployment options and network configurations for the reporting module 214 are described hereinafter.

Community Threat Intelligence System

The community threat intelligence system 206 receives and processes sanitized telemetry data 238 from a set of telemetry sanitization systems 208 deployed in a set of OT networks (e.g. participant OT network 120). For example, the community threat intelligence system 206 may process sanitized telemetry data 238 received from a plurality of participants. The sanitized telemetry data 238 cannot be traced back to the originating participant, an individual associated with the participant, the telemetry processing system 202, the participant OT network, or any device originally described by the telemetry data 218 before the sanitization module 214 applied the sanitization procedure to the telemetry data 218.

The community threat intelligence system 206 may include a sanitized data receiving module 230, a threat analysis module 232, and/or a community portal server module 234. The sanitized data receiving module 230, the threat analysis module 232, and/or the community portal server module 234 may include separate and/or shared processes. The sanitized data receiving module 230, a threat analysis module 232, and/or a community portal server module 234 may execute as one or multiple applications on one or more computer systems, and may be implemented in a distributed system architecture, a cloud system architecture, and/or a virtual system.

The sanitized data receiving module 230 receives sanitized telemetry data 238 from a set of telemetry sanitization systems 208. The sanitized telemetry data 238 is a pool of anonymized and/or pseudonymized data that is aggregated from multiple OT environments. The sanitized telemetry data 238 excludes sensitive data that may cause a privacy risk or a security risk for participants that provided the sanitized telemetry data 238. For example, the sanitized telemetry data 238 may exclude any information usable to identify a participant, an individual associated with a participant, a participant network, or a participant device. Furthermore, the community threat intelligence system 206 does not possess any identification data 222 that is necessary to reidentify any participants, participant's networks, and/or participant devices.

The threat analysis module 232 generates threat intelligence data 240 based on the sanitized telemetry data 238. Threat intelligence data 240 includes data resulting from processing and/or analyzing telemetry data 218 collected in an OT network and/or sanitized telemetry data 238 generated from such telemetry data 218. The threat intelligence data 240 may read on attack behaviors, motives, targets, and other properties of a security threat. For example, the threat intelligence data 240 may describe one or more techniques for detecting a security threat and/or one or more countermeasures for addressing a detected security threat. The threat analysis module 232 may perform fully automated analysis of the sanitized telemetry data 238, partially automated analysis, and/or analyst-assisted analysis. In some embodiments, the threat analysis module 232 identifies potentially interesting data and flags the data for further analysis. In some embodiments, the threat analysis module 232 provides an interface that allows an analyst to visualize, process, and/or perform other operations on the sanitized telemetry data 238.

In some embodiments, the threat analysis module 232 obtains additional information from one or more participants. For example, the threat analysis module 232 may implement an automated survey or request for information from participants. An automated survey or request may be directed to all participants, a subset of participants, and/or specific participants. The automated survey or request may be completed by one or more participants. In some embodiments, the survey is presented to a participant that is authenticated in a manner that does not reveal the identity of the participant, the identity of an individual associated with the participant, and/or any OT network or device information. For example, the community threat intelligence system 206 may publish a request to a participant using one or more participant pseudonyms. In some embodiments, an automated survey request is made by an analyst seeking more information about a particular security event described by sanitized telemetry data 238 that includes a specific participant's pseudonym.

Community Portal

The community portal server module 234 makes threat intelligence data 240 available to a set of viewer devices 250. For example, a participant or customer may operate a viewer device 250 to access the threat intelligence data 240 and/or the sanitized telemetry data 238. In some embodiments, the community portal server module 234 operates as a web server. The viewer devices 250 include a community portal client module 252 that communicates with the community portal server module 234. The community portal client module 252 may operate in an application that executes at the viewer devices 250. As an alternative or addition, the community portal client module 250 may be a web application that executes in a browser at the viewer devices 250. The community portal server module 234 may provide web code that, when executed in a browser on a viewer device 250, creates an instance of the community portal server module 234. In some embodiments, the community portal server module 234 is deployed in the cloud. Individual users granted access to the threat intelligence data 240 and/or the sanitized telemetry data 238 may have customized access control and/or permissions to access specified subsets of data.

As an alternative or addition, one or more third parties may be granted access to the threat intelligence data 240 and/or the sanitized telemetry data 238 using the community portal client module 252. For example, a third party may be given access to the threat intelligence data 240 and/or the sanitized telemetry data 238 to participate in community analytic development. For example, third parties granted access may include a government agency, a regulatory body, and/or an industry trade group. In some embodiments, one or more third parties that are granted access to the threat intelligence data 240 and/or the sanitized telemetry data 238 are trusted entities, and may go through a process to become verified partners.

In some embodiments, the community portal server module 234 provides an interface to a user via the community portal client module 252 that allows an analyst to visualize, process, and/or perform other operations on the sanitized telemetry data 238. A third party may be allowed to submit third-party threat intelligence. For example, the community portal client module 252 may be configured to submit third-party threat intelligence to the community portal server module 234. The third-party threat intelligence may be evaluated and/or added to the threat intelligence data 240. Third-party threat intelligence may be distributed by the community threat intelligence system 206. For example, the community portal server module 234 may provide third-party threat intelligence to other users via community portal client modules 252.

Example Deployment Configuration Options

Figure 3A:
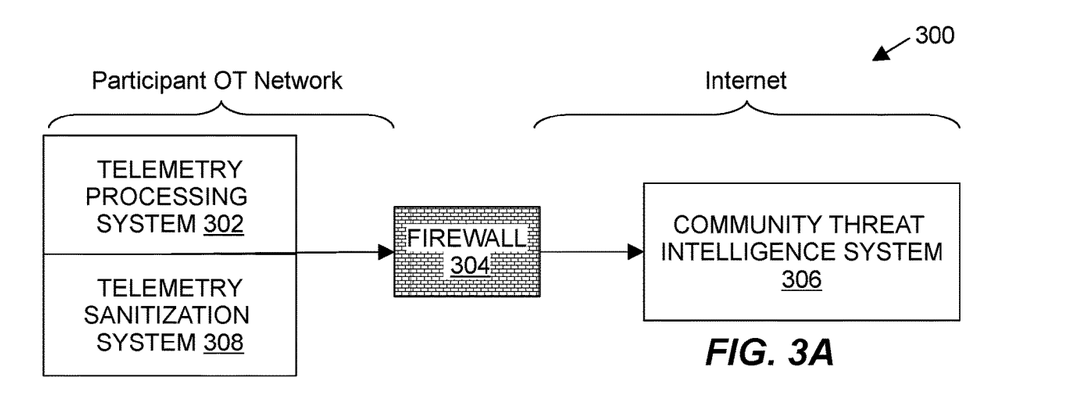
FIGS. 3A-3C illustrate deployment options for a telemetry sanitization system in a participant's network in example embodiments.
Figure 3B:
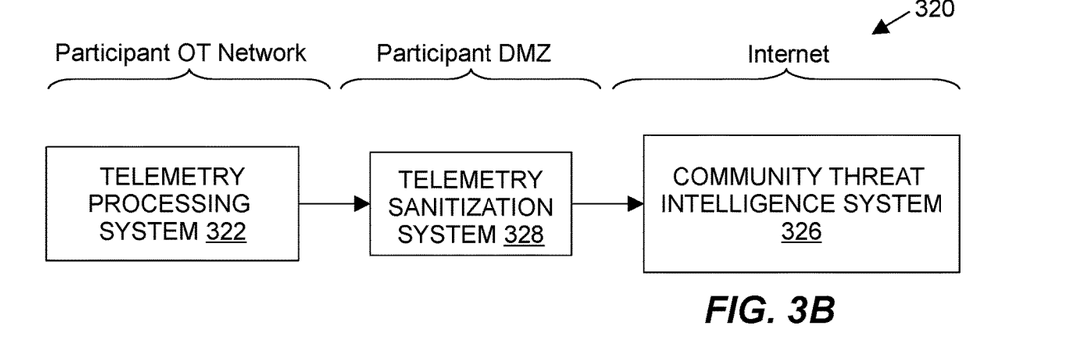
Figure 3C:
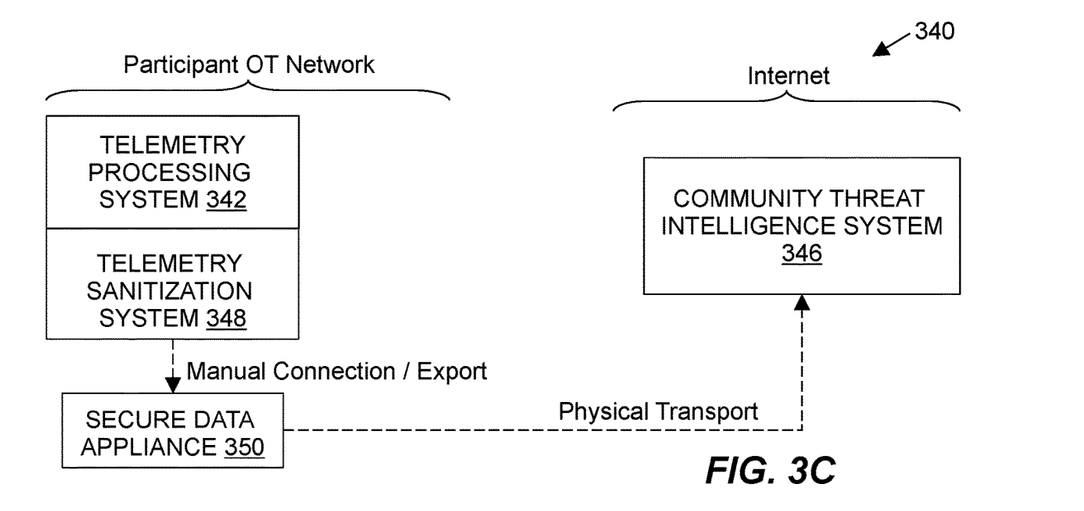

FIGS. 3A-3C illustrate deployment options for a telemetry sanitization system in a participant's network in example embodiments. The following embodiments are deployment examples; other configurations may be implemented without departing from the spirit or the scope of the techniques described herein. In the deployment examples, the telemetry processing systems 302, 322, 342 receive and process telemetry data. The telemetry processing systems 302, 322, 342 may select at least a portion of the telemetry data for sanitizing and providing to the telemetry sanitization systems 308, 328, 346 which sanitizes the data and provides it to the community threat intelligence systems 306, 326, 346. In some embodiments, the telemetry sanitization systems 308, 328, 346 are implemented as a library and/or service that presents an application programming interface (API) to the telemetry processing systems 302, 322, 342. For example, the API may include functions for sanitizing telemetry data submitted by the telemetry processing systems 302, 322, 342.

The telemetry sanitization systems 308, 328, 348 may also be configured to facilitate secure communication of sanitized telemetry data to the community threat intelligence systems 306, 326, 346. The sanitized telemetry data received by a community threat intelligence system 306, 326, 346 cannot be traced back to the originating participant, an individual associated with the participant, the participant network, the telemetry processing system 302, 322, 342, or any device originally described by the telemetry data before processing by the telemetry sanitization systems 308, 328, 348. That is, a party with access to the community threat intelligence system 306 will not have the data necessary to identify the participant, an associated individual, the participant network, or any participant device based on the sanitized telemetry data.

FIG. 3A illustrates a computer system comprising a telemetry sanitization system with a direct cloud connection to a community threat intelligence system. The computer system 300 includes a telemetry processing system 302, a telemetry sanitization system 308, and a community threat intelligence system 306. The telemetry processing system 302 is located within a participant network, such as an OT network (e.g., participant OT network 120) or an IT network (e.g., participant IT network 110).

The telemetry sanitization system 308 may be deployed as a standalone system or within the telemetry processing system 302. In some embodiments, the telemetry sanitization system 308 is deployed as a virtual machine or container on the telemetry processing system 302. Within the telemetry processing system 302, the telemetry sanitization system 308 generates sanitized telemetry data and provides the sanitized telemetry data to the community threat intelligence system 306. The participant network may be protected by a firewall 304 that is configured to allow communication from the telemetry sanitization engine 308 to the community threat intelligence system 306. The telemetry sanitization system 308 is configured to establish a secure communication channel with the community threat intelligence system 306. For example, the firewall 304 may allow a direct, outgoing internet connection from the telemetry processing engine 302 to the community threat intelligence system 306.

FIG. 3B illustrates a computer system comprising a telemetry processing system that provides telemetry data to a telemetry sanitization system in a demilitarized zone (DMZ). The computer system 320 includes a telemetry processing system 322, a telemetry sanitization system 328, and a community threat intelligence system 326. The telemetry processing system 322 is located within a participant OT network (e.g., participant OT network 120).

The telemetry sanitization system is deployed on a computing device within the DMZ (e.g., DMZ 180) associated with the participant OT network. In some embodiments, the telemetry sanitization system 328 is deployed as a virtual machine or container on the computing device within the DMZ. The telemetry processing system 322 is configured to establish a secure communication channel with the telemetry sanitization system 328. For example, a firewall (e.g., firewall 104) may allow a direct, outgoing connection from the telemetry processing engine 322 to the telemetry sanitization system 328 in the DMZ. The telemetry sanitization system 328 generates sanitized telemetry data and provides the sanitized telemetry data to the community threat intelligence system 326. For example, a firewall (e.g., firewall 105) may allow a direct, outgoing connection from the telemetry sanitization system 328 in the DMZ to the community threat intelligence system 306.

FIG. 3C illustrates a computer system with an air-gapped telemetry processing system. The computer system 340 includes a telemetry processing system 342, a telemetry sanitization system 348, and a community threat intelligence system 346. The telemetry processing system 342 is located within a participant OT network (e.g., participant OT network 120). The telemetry sanitization system 348 may be deployed within the telemetry processing system 342. In some embodiments, the telemetry sanitization system 348 is deployed as a virtual machine or container on the telemetry processing system 342. The telemetry processing system 342 is not authorized to establish an Internet connection.

Sanitized telemetry data is manually exported from the participant OT network. For example, authorized personnel with access to the telemetry processing system 342 may connect a secure storage device to the telemetry processing system 342, initiate the generation of sanitized telemetry data, and/or initiate the transfer of sanitized telemetry data to the secure storage device. In some embodiments, the telemetry sanitization system 348 caches requests from the telemetry processing system 342 to sanitize telemetry data for execution during an export. The authorized personnel may include individuals with secured access implemented through physical security, passwords, biometrics, and/or other authentication methods. An example of a secure storage device and transport service is AWS Snowball. The secure storage device may be physically transported to an external facility for upload to the community threat intelligence system 346.

Telemetry Data Sanitization Techniques

A monitoring device 272 may receive and inspect network traffic data that includes sensitive and/or identifying information. For example, the monitoring device 272 may perform deep packet inspection and determine values for one or more properties associated with a communication. The values may be present in the network traffic data and/or generated by the monitoring device 272 and/or the telemetry processing system 202 by association, analysis, or other techniques. The telemetry data 218 may include one or more of these property values. The property values may include, but are not limited to:
 a source device IP address,
 a source device MAC address,
 a source communication port,
 another source device identifier,
 a source device manufacturer, a source device hardware and/or firmware version,
 a source device type,
 a destination device IP address,
 a destination device MAC address,
 a destination communication port,
 another destination device identifier,
 a source device manufacturer,
 a source device hardware and/or firmware version,
 a source device type,
 one or more timestamps,
 a participant identifier and/or other information about a participant,
 a network address and/or other information about an OT network,
 an IP address, MAC address, and/or other information about the monitoring device intercepting the communication,
 a communication protocol,
 one or more OT reading values (e.g., value/s obtained by a sensor 132),
 one or more OT control commands issued,
 a communication type,
 information describing a detected security threat (e.g., type, severity, identifier, etc.),
 other data included in raw OT network traffic,
 other data generated by the monitoring device 272, and/or
 other data generated by the telemetry processing system 202.

The telemetry data 218 within a participant's network may include sensitive and/or identifiable information with respect to the participant, an individual associated with the participant, the participant OT network, and/or participant devices in the OT network. While the telemetry processing system 202 may utilize such data to identify particular vulnerabilities, anomalies, threats, intrusions, or other events involving particular devices on the OT network, exposure of such information outside of the participant's network may constitute a privacy breach and/or a security risk. For example, the exposure of network identifiers such as IP addresses, MAC addresses, and hostnames may provide an adversary insight into a participant's network.

Figure 4:
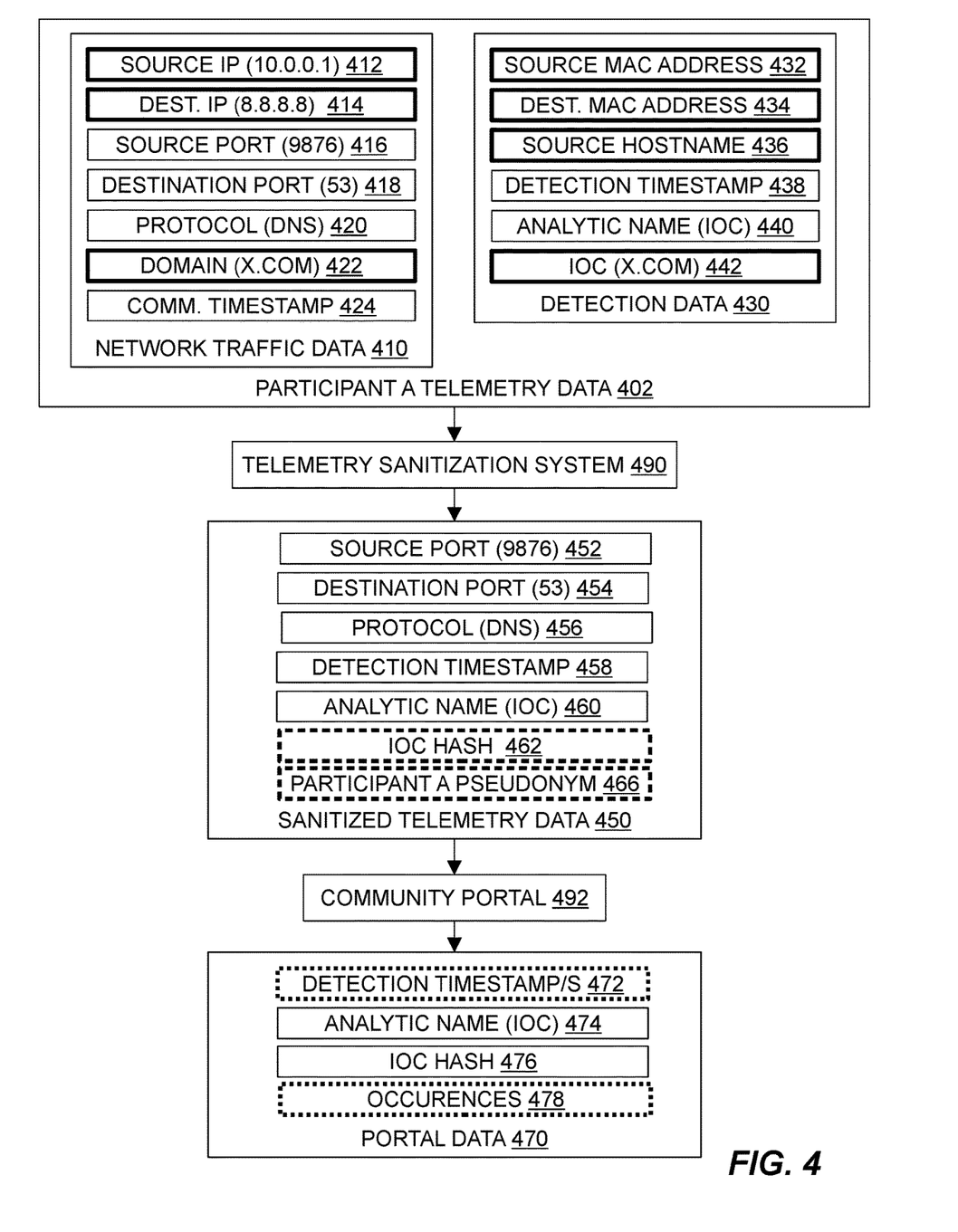
FIG. 4 illustrates telemetry data, sanitized telemetry data, and portal data in an example embodiment.

The sanitization module 212 prepares telemetry data 218 for transmission to the community threat intelligence system 206 by applying a sanitization process to the telemetry data 218. FIG. 4 illustrates telemetry data, sanitized telemetry data, and portal data in an example embodiment. Participant A telemetry data 402 includes telemetry data (e.g., telemetry data 218) for an example communication detected in Participant A's OT network (e.g., participant OT network 120). The telemetry data 402 may include network traffic data 410 that is parsed from OT network traffic collected by a monitoring device (e.g., monitoring devices 172-174, 272). The telemetry data 402 may also include detection data 430 generated by additional processing of parsed data. The detection data 430 may be generated by a monitoring device and/or a telemetry processing system (e.g., telemetry processing system 102, 202, 302, 322, 342). The telemetry data 402 may include sensitive and/or identifiable information with respect to Participant A, Participant A's OT network, and/or devices in Participant A's OT network. For example, data values 412, 414, 422, 432,434, 436, 442 may be considered sensitive and/or identifiable information in the example, while data values 416, 418, 420, 424, 438, 440 are not.

The telemetry processing system in Participant A's network may determine that data about the example communication should be provided to a community threat intelligence system (e.g., community threat intelligence system 106, 206, 306, 326, 346). For example, the determination may be based on a threat detection module (e.g., threat detection module 210) determining that a particular security event rule, or analytic 440, is triggered. A telemetry sanitization system 490 sanitizes the telemetry data 402 corresponding to the example communication to generate corresponding sanitized telemetry data 450. The telemetry sanitization system 490 may include relevant data values 452, 454, 456, 458, 460 present in the telemetry data 402 that are non-sensitive and non-identifying. The telemetry sanitization system 490 may omit data values that are sensitive and/or identifying.

In some embodiments, the telemetry sanitization system 490 generates and adds de-identified data to the sanitized telemetry data 450. For example, the telemetry sanitization system 490 may add Participant A's pseudonym 466 to the sanitized telemetry data 450. The association between Participant A and Participant A's pseudonym 466 is maintained only in Participant A's network (e.g., in pseudonymization data 222). The community threat intelligence system does not possess data usable to deidentify the pseudonym value 466 to determine the identity or other information about Participant A.

As an alternative and/or addition, the telemetry sanitization system 490 may apply a function to a particular data value to transform sensitive and/or identifying data into non-sensitive, de-identified data. In the example, the telemetry sanitization system 490 applies a hash function to IOC 442, which includes a malicious domain name associated with the example communication. The output of the hash function is an irreversible but likely unique value, making it computationally infeasible to calculate the IOC/domain name 442 from the IOC hash 462. However, the hash presence of the IOC hash 462 in the sanitized telemetry data 450 makes it possible for threat analysis to be performed, both because the IOC hash 462 is likely unique and because someone with knowledge of the IOC/domain name 442 may look up sanitized telemetry data 450 related to the domain name by applying the hash function to the IOC/domain name 442 and searching for the resulting hash value.

The community threat intelligence system may make the sanitized telemetry data 450 available to one or more users via a community portal 492. In some embodiments, the community threat intelligence system may further process the sanitized telemetry data 450 to limit access to the sanitized telemetry data 450 and/or to present the sanitized telemetry data 450 in a more usable manner. In the example, the community portal 492 generates and provides aggregated portal data 470. For example, the community threat intelligence system may aggregate the sanitized telemetry data 450 from Participant A's OT network with other sanitized telemetry data with the same analytic name 474 (indicating the same type of security threat) and/or the same IOC hash 476 (indicating the same malicious domain name). The detection timestamps 472 is an aggregated set of times of detection of the particular type of security threat involving the same malicious domain, thereby providing insight on the behavior of the particular security threat. The occurrences 478 value is an aggregated count of the number of times the detection occurred.

The sanitization techniques described herein are non-limiting examples; similar sanitization techniques may be used in accordance with the embodiments described herein. Although particular data fields are shown as included, modified, omitted, de-identified, or otherwise processed in FIG. 4, sanitization techniques may be applied to any telemetry data described herein.

Example Processes

Figure 5:
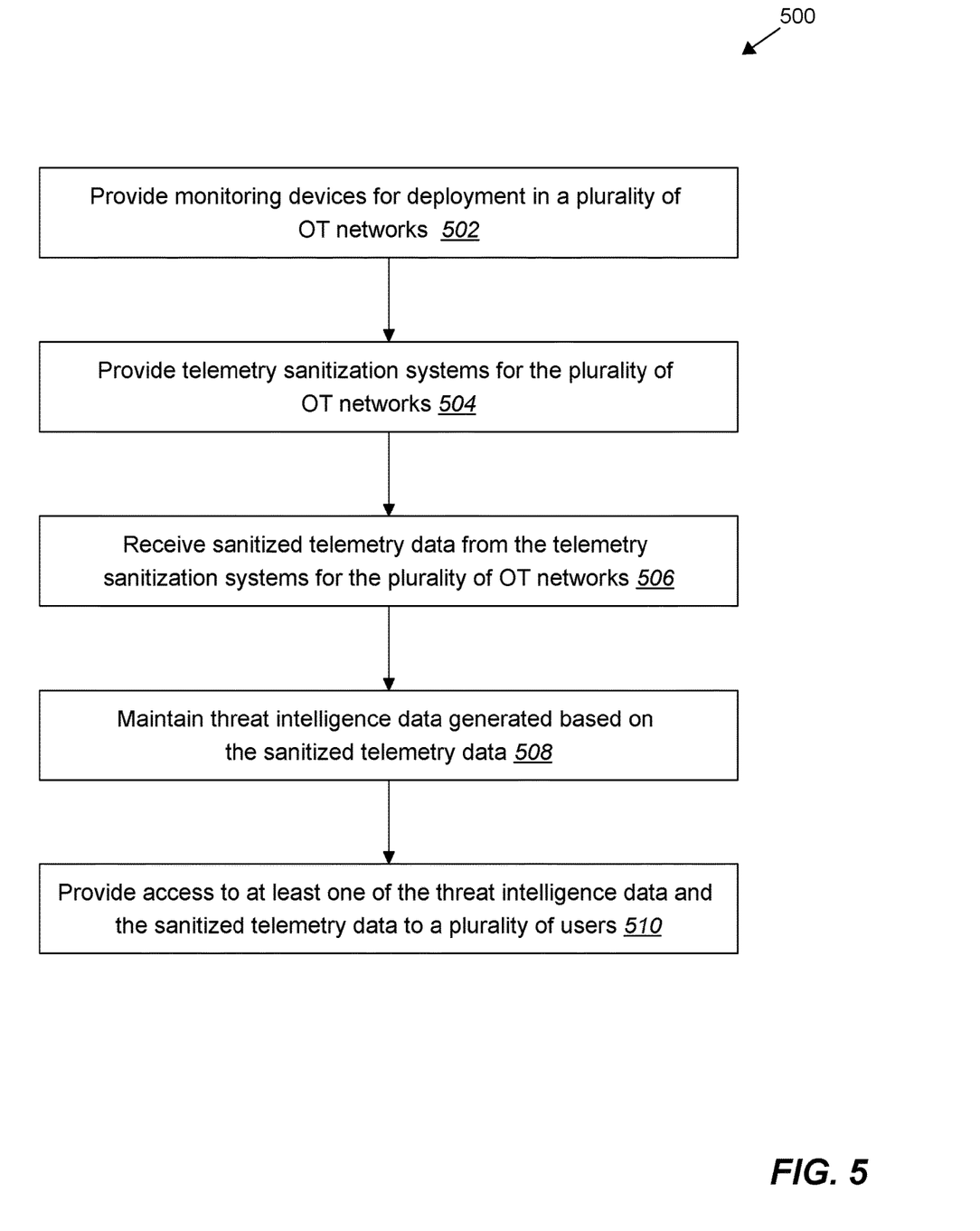
FIG. 5 is a flow diagram of a process for providing sanitized OT network data in an example embodiment.

FIG. 5 is a flow diagram of a process for providing sanitized OT network data in an example embodiment. Process 500 may be performed by one or more computing devices and/or processes thereof. For example, one or more blocks of process 500 may be performed by a computer system, such as but not limited to computer system 600. In some embodiments, one or more blocks of process 500 are performed by a community threat intelligence system (e.g., community threat intelligence system 106. 206, 306, 326, 346). Process 500 will be described with respect to a community threat intelligence system, but is not limited to performance by a community threat intelligence system.

At block 502, at least one monitoring device is provided for deployment in each OT network of a plurality of OT networks. At block 504, a telemetry sanitization system is provided for each OT network. Each telemetry sanitization system is configured to apply a sanitization process to the telemetry data collected by the at least one monitoring device to generate sanitized telemetry data that does not include sensitive data. At block 506, the community threat intelligence system receives sanitized telemetry data from the telemetry sanitization systems provided for the plurality of OT networks. At block 508, the community threat intelligence system maintains threat intelligence data generated based on the sanitized telemetry data. The threat intelligence data describing a plurality of security threats identified in the plurality of OT networks. At block 510, the community threat intelligence system provides access to at least one of the threat intelligence data and the sanitized telemetry data to a plurality of users.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 6:
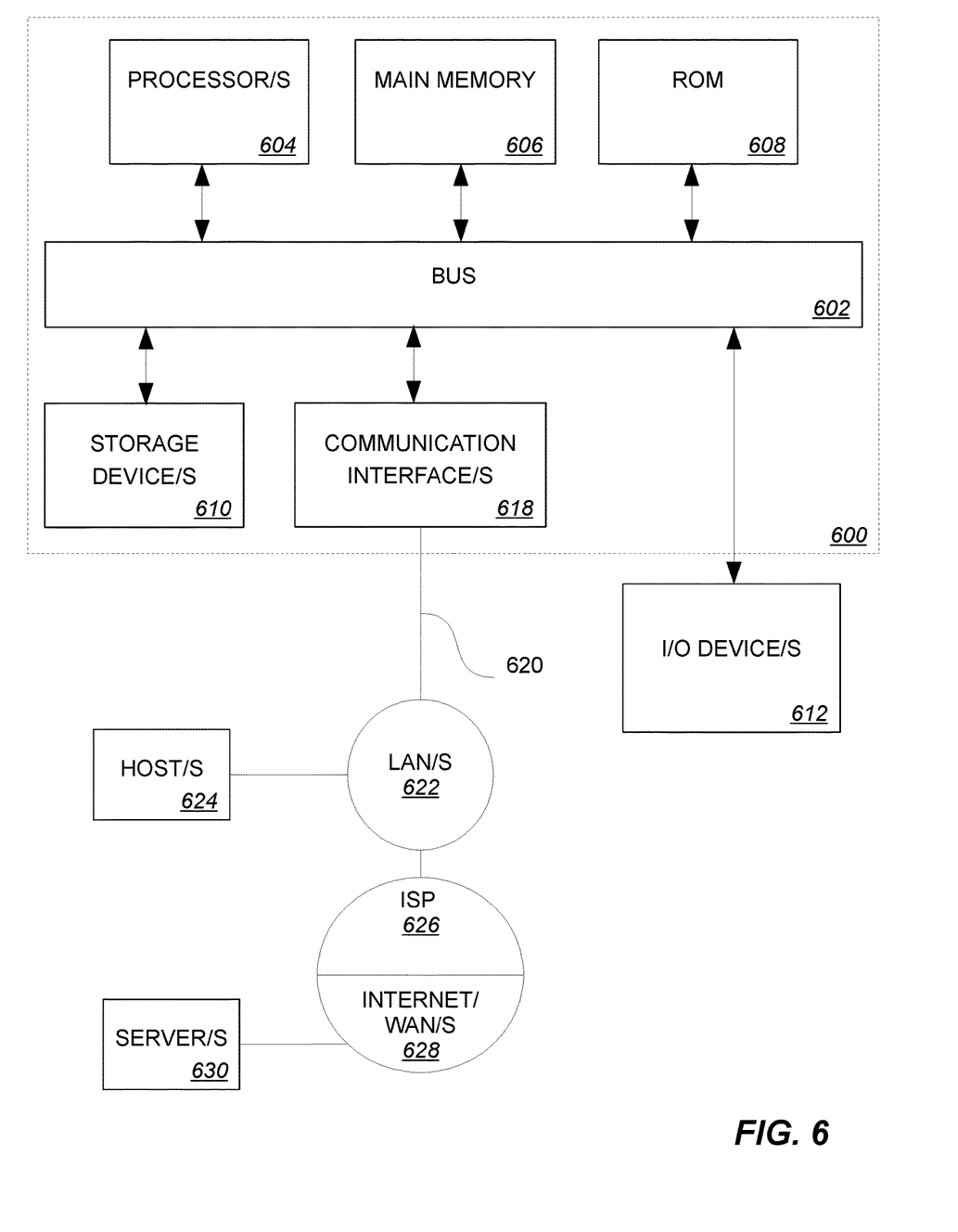
FIG. 6 illustrates a computer system upon which an embodiment may be implemented.

FIG. 6 is a block diagram that illustrates a computer system 600 upon which an embodiment may be implemented. The computer system 600 includes a bus 602 or other communication mechanism for communicating information, and one or more hardware processors 604 coupled with bus 602 for processing information, such as computer instructions and data. The hardware processor/s 604 may include one or more general-purpose microprocessors, graphical processing units (GPUs), coprocessors, central processing units (CPUs), and/or other hardware processing units.

The computer system 600 also includes one or more units of main memory 606 coupled to the bus 602, such as random-access memory (RAM) or other dynamic storage, for storing information and instructions to be executed by the processor/s 604. Main memory 606 may also be used for storing temporary variables or other intermediate information during execution of instructions to be executed by the processor/s 604. Such instructions, when stored in non-transitory storage media accessible to the processor/s 604, turn the computer system 600 into a special-purpose machine that is customized to perform the operations specified in the instructions. In some embodiments, main memory 606 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 600 may further include one or more units of read-only memory (ROM) 608 or other static storage coupled to the bus 602 for storing information and instructions for the processor/s 604 that are either always static or static in normal operation but reprogrammable. For example, the ROM 608 may store firmware for the computer system 600. The ROM 608 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 610, such as a magnetic disk or optical disk, is provided and coupled to the bus 602 for storing information and/or instructions. The storage device/s 610 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 600 may be coupled via the bus 602 to one or more input/output (I/O) devices 612. For example, the I/O device/s 612 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 612 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 604 and for controlling cursor movement on another I/O device (e.g. a display). A cursor control device typically has at degrees of freedom in two or more axes, (e.g. a first axis x, a second axis y, and optionally one or more additional axes z), that allows the device to specify positions in a plane. In some embodiments, the one or more I/O device/s 612 may include a device with combined I/O functionality, such as a touch-enabled display.

Other I/O device/s 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 604 over the bus 602.

The computer system 600 may implement the techniques described herein using customized hard-wired logic, one or more ASICs or FPGAs, firmware, and/or program logic which, in combination with the computer system causes or programs, causes computer system 600 to be a special-purpose machine. According to one embodiment, the techniques herein are performed by the computer system 600 in response to the processor/s 604 executing one or more sequences of one or more instructions contained in main memory 606. Such instructions may be read into main memory 606 from another storage medium, such as the one or more storage device/s 610. Execution of the sequences of instructions contained in main memory 606 causes the processor/s 604 to perform the process steps described herein. In alternative embodiments, hard-wired circuitry may be used in place of or in combination with software instructions.

The computer system 600 also includes one or more communication interfaces 618 coupled to the bus 602. The communication interface/s 618 provide two-way data communication over one or more physical or wireless network links 620 that are connected to a local network 622 and/or a wide area network (WAN), such as the Internet. For example, the communication interface/s 618 may include an integrated services digital network (ISDN) card, cable modem, satellite modem, or a modem to provide a data communication connection to a corresponding type of telephone line. Alternatively and/or in addition, the communication interface/s 618 may include one or more of: a local area network (LAN) device that provides a data communication connection to a compatible local network 622; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 628); and other networking devices that establish a communication channel between the computer system 600 and one or more LANs 622 and/or WANs.

The network link/s 620 typically provides data communication through one or more networks to other data devices. For example, the network link/s 620 may provide a connection through one or more local area networks 622 (LANs) to one or more host computers 624 or to data equipment operated by an Internet Service Provider (ISP) 626. The ISP 626 provides connectivity to one or more wide area networks 628, such as the Internet. The LAN/s 622 and WAN/s 628 use electrical, electromagnetic, or optical signals that carry digital data streams. The signals through the various networks and the signals on the network link/s 620 and through the communication interface/s 618 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid-state drive of a remote computer. The remote computer can load the instructions into its main memory 606 and send the instructions over a telecommunications line using a modem. A modem local to the computer system 600 can receive the data on the telephone line and use an infra-red transmitter to convert the data to an infra-red signal. An infra-red detector can receive the data carried in the infra-red signal and appropriate circuitry can place the data on the bus 602. The bus 602 carries the data to main memory 606, from which the processor 604 retrieves and executes the instructions. The instructions received by main memory 606 may optionally be stored on the storage device 610 either before or after execution by the processor 604.

The computer system 600 can send messages and receive data, including program code, through the network(s), the network link 620, and the communication interface/s 618. In the Internet example, one or more servers 630 may transmit signals corresponding to data or instructions requested for an application program executed by the computer system 600 through the Internet 628, ISP 626, local network 622 and a communication interface 618. The received signals may include instructions and/or information for execution and/or processing by the processor/s 604. The processor/s 604 may execute and/or process the instructions and/or information upon receiving the signals by accessing main memory 606, or at a later time by storing them and then accessing them from the storage device/s 610.

Other Aspects of Disclosure

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments are described with reference to specific details that may vary from implementation to implementation. Nevertheless, it will be understood that various modifications may be made without departing from the spirit and scope of the invention. The examples set forth above are provided to those of ordinary skill in the art as a complete disclosure and description of how to make and use the embodiments, and are not intended to limit the scope of what the inventor/inventors regard as their invention. Modifications of the above-described modes for carrying out the methods and systems herein disclosed that are obvious to persons of skill in the art are intended to be within the scope of the present disclosure and the following claims. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
for each operational technology (OT) network of a plurality of OT networks, said each OT network being a segmented network that is isolated from the Internet and comprising at least one physical process device and at least one control device configured to control the at least one physical process device:
providing at least one monitoring device for deployment in said each OT network, the at least one monitoring device configured to process OT network traffic in an OT network protocol and collect telemetry data including telemetry data corresponding to the at least one physical process device and at least one control device, and
providing a telemetry sanitization system for said each OT network, the telemetry sanitization system configured to apply a sanitization process to the telemetry data collected by the at least one monitoring device to generate sanitized telemetry data that does not include sensitive data identifying said each OT network, any of the at least one process device, and any of the at least one control device;
receiving the sanitized telemetry data from the telemetry sanitization systems provided for the plurality of OT networks;
maintaining threat intelligence data generated based on the sanitized telemetry data, the threat intelligence data describing a plurality of security threats identified in the plurality of OT networks based on contextual data of the sanitized telemetry data, the threat intelligence data being insufficient to reidentify any OT network, any process device of a respective OT network, and any control device of a respective OT network; and
providing access to at least one of the threat intelligence data and the sanitized telemetry data to a plurality of users;
wherein receiving the sanitized telemetry data, maintaining the threat intelligence data, and providing access are performed by one or more computing devices.

2. The method of claim 1, wherein the sensitive data includes identifying data usable to identify at least one of:
an OT network of the plurality of OT networks,
an operator of the OT network,
an individual associated with the OT network, and
a device in the OT network.

3. The method of claim 1, wherein the threat intelligence data includes at least one of one or more techniques for detecting a security threat and one or more countermeasures for addressing a detected security threat.

4. The method of claim 1, wherein the telemetry sanitization system is deployed in the OT network behind a firewall configured to allow an outgoing-only Internet connection from the telemetry processing engine to provide the sanitized telemetry data.

5. The method of claim 1, wherein the telemetry sanitization system is deployed in a demilitarized zone (DMZ) between the OT network and a corresponding IT network, the DMZ comprising a first firewall configured to allow an outgoing-only connection from the OT network to the telemetry processing engine, the DMZ comprising a second firewall configured to allow an outgoing-only Internet connection from the telemetry processing engine to provide the sanitized telemetry data.

6. The method of claim 1, wherein the plurality of users comprises one or more users associated with a government agency, a regulatory body, or an industry trade group.

7. The method of claim 1, further comprising analyzing the sanitized telemetry data to generate threat intelligence data describing at least one security threat of the plurality of security threats.

8. The method of claim 1, further comprising receiving threat intelligence data describing at least one security threat of the plurality of security threats from one or more users of the plurality of users.

9. The method of claim 8, further comprising providing access to the threat intelligence data through the cloud-based portal.

10. The method of claim 1, wherein providing access to the sanitized telemetry data includes providing a cloud-based portal for accessing the sanitized telemetry data.

11. A system comprising:
one or more hardware processors;
at least one memory coupled to the one or more hardware processors and storing one or more instructions which, when executed by the one or more hardware processors, cause the one or more hardware processors to:
receive sanitized telemetry data from a plurality of telemetry sanitization systems deployed in association with a plurality of operational technology (OT) networks, each telemetry sanitization system providing sanitized telemetry data describing OT network traffic in an OT network protocol corresponding to at least one physical process device and at least one control device configured to control the at least one physical process device on a particular OT network isolated from the Internet, the sanitized telemetry data omitting sensitive data identifying the particular OT network, any of the at least one process device, and any of the at least one control device;
maintain threat intelligence data generated based on the sanitized telemetry data, the threat intelligence data describing a plurality of security threats identified in the plurality of OT networks based on contextual data of the sanitized telemetry data, the threat intelligence data being insufficient to reidentify any OT network, any process device of a respective OT network, and any control device of a respective OT network, and
provide access to at least one of the threat intelligence data and the sanitized telemetry data to a plurality of users.

12. The system of claim 11, further comprising the plurality of telemetry sanitization systems, each telemetry sanitization system comprising:
one or more hardware processors;
at least one memory coupled to the one or more hardware processors and storing one or more instructions which, when executed by the one or more hardware processors, cause the one or more hardware processors to:
apply a sanitization process to the telemetry data collected by at least one monitoring device deployed in a respective OT network to process OT network traffic and collect telemetry data; and
generate sanitized telemetry data that does not include sensitive data.

13. The system of claim 11, wherein the threat intelligence data includes at least one of one or more techniques for detecting a security threat and one or more countermeasures for addressing a detected security threat.

14. The system of claim 11, wherein receiving the sanitized telemetry data includes receiving sanitized telemetry data from a particular telemetry sanitization system deployed in a particular OT network behind a firewall configured to allow an outgoing-only Internet connection from the telemetry processing engine.

15. The system of claim 11, wherein receiving the sanitized telemetry data includes receiving sanitized telemetry data from a particular telemetry sanitization system deployed in a demilitarized zone (DMZ) between a particular OT network and a corresponding IT network, the DMZ comprising a first firewall configured to allow an outgoing-only connection from the particular OT network to the telemetry processing engine, the DMZ comprising a second firewall configured to allow an outgoing-only Internet connection from the particular telemetry processing engine.

16. The system of claim 11, wherein the plurality of users comprises one or more users associated with a government agency, a regulatory body, or an industry trade group.

17. The system of claim 11, wherein the one or more instructions, when executed by the one or more hardware processors, cause the one or more hardware processors to:
analyze the sanitized telemetry data to generate threat intelligence data describing at least one security threat of the plurality of security threats.

18. The system of claim 11, wherein the one or more instructions, when executed by the one or more hardware processors, cause the one or more hardware processors to:
receive threat intelligence data describing at least one security threat of the plurality of security threats from one or more users of the plurality of users.

19. The system of claim 18, wherein the one or more instructions, when executed by the one or more hardware processors, cause the one or more hardware processors to:
provide access to the threat intelligence data through the cloud-based portal.

20. The system of claim 11, wherein providing access to the sanitized telemetry data includes providing a cloud-based portal for accessing the sanitized telemetry data.

* * * * *